US008088961B2

(12) United States Patent
Miller (10) Patent No.: US 8,088,961 B2
(45) Date of Patent: *Jan. 3, 2012

(54) PROCESS FOR PREPARING A POUR POINT DEPRESSING LUBRICANT BASE OIL COMPONENT FROM WASTE PLASTIC AND USE THEREOF

(75) Inventor: Stephen J. Miller, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 684 days.

This patent is subject to a terminal disclaimer.

(21) Appl. No.: 12/005,281

(22) Filed: Dec. 27, 2007

(65) Prior Publication Data

US 2009/0170739 A1    Jul. 2, 2009

(51) Int. Cl.
*C10G 57/00* (2006.01)
*C10G 1/00* (2006.01)
*C10L 1/16* (2006.01)

(52) U.S. Cl. ............ 585/241; 208/18; 208/27; 208/950; 508/591

(58) Field of Classification Search .................. 508/591; 208/18, 27, 950; 585/241
See application file for complete search history.

(56) References Cited

U.S. PATENT DOCUMENTS

| | | | |
|---|---|---|---|
| 3,226,339 A | 12/1965 | Frilette et al. | |
| 3,236,761 A | 2/1966 | Rabo et al. | |
| 3,236,762 A | 2/1966 | Rabo et al. | |
| 3,373,109 A | 3/1968 | Frilette et al. | |
| 3,620,960 A | 11/1971 | Kozlowski et al. | |
| 3,852,207 A | 12/1974 | Stangeland et al. | |
| 3,904,513 A | 9/1975 | Fischer et al. | |
| 4,016,218 A | 4/1977 | Haag et al. | |
| 4,016,245 A | 4/1977 | Plank | |
| 4,016,246 A | 4/1977 | Whittam | |
| 4,076,842 A | 2/1978 | Plank et al. | |

(Continued)

FOREIGN PATENT DOCUMENTS

EP          102716        11/1982

(Continued)

OTHER PUBLICATIONS

International Preliminary Report and Written Opinion from PCT/US2008/084119, mailed Jul. 8, 2010, 5 pages.

(Continued)

*Primary Examiner* — Glenn Caldarola
*Assistant Examiner* — Vishal Vasisth
(74) *Attorney, Agent, or Firm* — Merchant & Gould (57) ABSTRACT

A process for making a pour point depressing lubricant base oil blending component comprises: pyrolyzing a plastics feed comprising polyethylene in a pyrolysis zone at a temperature in the range of about 450° C. to about 700° C. and a residence time in the range of about 3 minutes to about 1 hour to provide a pyrolysis effluent; isomerization dewaxing at least a portion of the pyrolysis effluent with an isomerization dewaxing catalyst in a catalytic isomerization dewaxing zone to provide a isomerization dewaxing effluent comprising a pour point depressing lubricant base oil blending component; and recovering the pour point depressing lubricant base oil blending component boiling in the range of about 900° F. to about 1100° F. and having a pour point in the range of about −15° C. to about 0° C. The pour point depressing lubricant base oil blending component can be used to improve lubricating properties (e.g. pour point) of a lubricant base oil.

33 Claims, 1 Drawing Sheet

U.S. PATENT DOCUMENTS

| | | | |
|---|---|---|---|
| 4,157,294 A | 6/1979 | Iwao et al. | |
| 4,202,996 A | 5/1980 | Hilfman | |
| 4,440,871 A | 4/1984 | Lok et al. | |
| 4,481,177 A | 11/1984 | Valyocsik | |
| 4,483,835 A | 11/1984 | Zones | |
| 4,533,649 A | 8/1985 | Ball et al. | |
| 4,556,477 A | 12/1985 | Dwyer | |
| 4,673,487 A | 6/1987 | Miller | |
| 4,710,485 A | 12/1987 | Miller | |
| 4,836,910 A | 6/1989 | Van de Griend et al. | |
| 5,135,638 A | 8/1992 | Miller | |
| 5,208,005 A | 5/1993 | Miller | |
| 5,252,527 A | 10/1993 | Zones | |
| 5,811,379 A | 9/1998 | Rossi et al. | |
| 6,066,603 A | 5/2000 | Emert et al. | |
| 6,703,535 B2 | 3/2004 | Johnson et al. | |
| 6,774,272 B2 * | 8/2004 | Miller | 585/241 |
| 6,822,126 B2 | 11/2004 | Miller | |
| 2003/0199717 A1 * | 10/2003 | Miller | 585/241 |
| 2003/0199718 A1 * | 10/2003 | Miller | 585/241 |
| 2007/0238628 A1 | 10/2007 | Haire et al. | |

FOREIGN PATENT DOCUMENTS

EP 065400 3/1984

OTHER PUBLICATIONS

Doddrell, D.T., et al., "Distortionless Enhancement of NMR Signals by Polarization Transfer", *Journal of Magnetic Resonance* 48:323-327 (1982).

Patt, S.L. and Shoolery, J.N., :Attached Proton Test for Carbon-13 NMR, *Journal of Magnetic Resonance* 46:535-530 (1982).

Lindeman, L.P., "Carbon-13 Nuclear Magnetic Resonance Spectrometry", *Analytical Chemistry* 43:1245-1252 (1971).

Netzel, D.A., et al., "1H- and 13C-m.n.r. studies on naphtha and light distillate saturate hydrocarbon fractions obtained from in-situ shale oil", *Fuel*, 60:307-320 (1981).

Breck, "Zeolite Molecular Sieves", Chapter 8, pp. 593-724, John Wiley & Sons, New York, 1974.

Anderson et al, "Reactions on ZSM-5-Type Zeolite Catalysts", J. Catalysis 58:114-130 (1979).

Barrer, R.M., "Zeolite Structures" Zeolites, Science and Technology, pp. 75—edited by F.R. Rodrigues, L.D. Rollman and C. Naccace, NATO ASI Series 1984.

* cited by examiner

FIG. 1

PROCESS FOR PREPARING A POUR POINT DEPRESSING LUBRICANT BASE OIL COMPONENT FROM WASTE PLASTIC AND USE THEREOF

FIELD OF ART

The present disclosure relates to a process for preparing a pour point depressing lubricant base oil blending component from a plastics feed. More specifically, the present disclosure relates to a process for preparing a pour point depressing lubricant base oil blending component by pyrolyzing and isomerizing a plastics feed. The present disclosure further relates to a process for improving the lubricating properties of a lubricant base oil by blending it with the pour point depressing lubricant base oil blending component and a lubricant base oil blend comprising the pour point depressing lubricant base oil blending component and a lubricant base oil.

BACKGROUND

Finished lubricants used for automobiles, diesel engines, axles, transmissions, and industrial applications consist of two general components, a lubricant base oil and additives. Lubricant base oil is the major constituent in these finished lubricants and contributes significantly to the properties of the finished lubricant. In general, a few lubricant base oils are used to manufacture a wide variety of finished lubricants by varying the mixtures of individual lubricant base oils and individual additives.

Numerous governing organizations, including Original Equipment Manufacturers (OEMs), the American Petroleum Institute (API), Association des Consructeurs d' Automobiles (ACEA), the American Society of Testing and Materials (ASTM), and the Society of Automotive Engineers (SAE), among others, define the specifications for lubricant base oils and finished lubricants. Increasingly, the specifications for finished lubricants are calling for products with excellent low temperature properties, high oxidation stability, and low volatility. Currently, only a small fraction of the lubricant base oils manufactured today are able to meet these demanding specifications.

Lubricant base oils are lubricant base oils having a viscosity of about 3 cSt or greater at 100° C., for example, about 4 cSt or greater at 100° C.; a pour point of about 9° C. or less, for example, about −15° C. or less; and a viscosity index (VI) that is usually about 90 or greater, for example, about 100 or greater. In general, lubricant base oils should have a Noack volatility no greater than current conventional Group I or Group II light neutral oils. Group II lubricant base oils are defined as having a sulfur content of equal to or less than 300 ppm, saturates equal to 90% or greater, and a VI between 80 and 120. Group III lubricant base oils are defined as having a sulfur content of equal to or less than 300 ppm, saturates equal to 90% or greater, and a VI of greater than 120.

Lubricant base oils refer to a hydrocarbon product having the above properties prior to the addition of additives. One class of additives are pour point depressants. Pour point is the lowest temperature at which movement of the lubricant base oil is observed. In order to meet the relevant pour point specification for a finished lubricant, it is often necessary to lower the pour point of the lubricant base oil by the addition of a pour point depressant. Pour point depressants are typically polymers with pendant hydrocarbon chains that interact with the paraffins in the lubricant base oil by inhibiting the formation of large wax crystal lattices. They generally have a wax-like paraffinic part, which co-crystallizes with the wax-forming components in the oil, and a polar part which hinders crystal growth. Examples of pour point depressants known in the art are ethylene-vinyl-acetate copolymers, vinyl-acetate olefin copolymers, alkyl-esters of styrene-maleic-anhydride copolymers, alkyl-esters of unsaturated-carboxylic acids, polyalkylacrylates, polyalklymethacrylates, alkyl phenols, and alpha-olefin copolymers. Many pour point depressants are solid at ambient temperature and must be diluted with solvent prior to use. Conventional pour point depressants are expensive adding significantly to the cost of preparing the finished lubricant.

Thus, there is a need for a less costly process for preparing a pour point depressant.

Additionally, there is a need for a process for preparing a pour point depressant that uses an inexpensive and readily available feedstock. There is also a need for a process for preparing a pour point depressant that provides a significant yield of the pour point depressant

SUMMARY

Provided herein is a process for making a pour point depressing lubricant base oil blending component. In its broadest aspect, the process comprises: pyrolyzing a plastics feed comprising polyethylene in a pyrolysis zone at a temperature in the range of about 450° C. to about 700° C. and a residence time in the range of about 3 minutes to about 1 hour to provide a pyrolysis effluent; isomerization dewaxing at least a portion of the pyrolysis effluent with an isomerization dewaxing catalyst in a catalytic isomerization dewaxing zone to provide a isomerization dewaxing effluent comprising a pour point depressing lubricant base oil blending component; and recovering the pour point depressing lubricant base oil blending component boiling in the range of about 900° F. to about 1100° F. and having a pour point in the range of about −15° C. to about 0° C.

Among other factors, it has been discovered that such a process provides a significant yield of the pour point depressing lubricant base oil blending component. When added to a lubricant base oil, the pour point depressing lubricant base oil blending component can reduce the pour point. It also has the potential to increase the viscosity index of, lower the sulfur content of, and/or decrease the Noack volatility of a lubricant base oil.

Also provided herein is a method for improving the lubricating properties of a lubricant base oil. Such method utilizes the pour point depressing lubricant base oil blending component made by the above-described process. More particularly, such method involves making a pour point depressing lubricant base oil blending component and blending the lubricant base oil and the pour point depressing lubricant base oil blending component.

Another method for improving the lubricating properties of a lubricant base oil is also disclosed herein. According to this method, the lubricant base oil is blended with a sufficient amount of a pour point depressing lubricant base oil blending component to provide a lubricant base oil blend having a reduced pour point, wherein the pour point depressing lubricant base oil blending component is recovered from a plastics feed comprising polyethylene that has been pyrolyzed and catalytically isomerization dewaxed, boils in the range of about 900° F. to about 1100° F., and has a pour point in the range of about −15° C. to about 0° C.

Yet another method for improving the lubricating properties of a lubricant base oil is disclosed herein. It comprises the following steps: (a) isomerization dewaxing a pyrolyzed plastics feed by contacting at least a portion of the pyrolyzed plastics feed with an isomerization dewaxing catalyst in a catalytic isomerization dewaxing zone to provide an isomerization dewaxing effluent comprising a pour point depressing lubricant base oil blending component, wherein the pyrolyzed plastics feed originates from a plastics feed comprising polyethylene that has been pyrolyzed; (b) recovering the pour point depressing lubricant base oil blending component boiling in the range of about 900° F. to about 1100° F. and having a pour point in the range of about −15° C. to about 0° C.; and (c) blending the pour point depressing lubricant base oil blending component with the lubricant base oil in the proper proportion to produce a lubricant base oil blend having a lower pour point than the lubricant base oil.

Additionally disclosed herein is a pour point depressing lubricant base oil blending component which is a product of a plastics feed subjected to pyrolysis and catalytic isomerization dewaxing, the product boiling between about 900° F. and about 1100° F. and having a pour point in the range of about −15° C. to about 0° C. and wherein the plastics feed comprises polyethylene.

Finally provided herein is a lubricant base oil blend comprising the pour point depressing lubricant base oil blending component, as described above, and a lubricant base oil.

DETAILED DESCRIPTION

Definitions

The terms "waste plastics" or "waste polyethylene" mean plastics or polyethylene that have been subject to use and are considered garbage, refuse, or material for recycling.

The terms "virgin plastics" or "virgin polyethylene" means plastics or polyethylene that are fresh and/or newly made and have not been subject to use.

As used herein, "additives" refers to chemicals that are added to a lubricant base oil in order to improve certain properties in the finished lubricant so that the finished lubricant meets relevant specifications.

"Pour point" refers to the temperature at which a hydrocarbon fraction (e.g. a lubricant base oil or a pour point depressing lubricant base oil blending component) will begin to flow under carefully controlled conditions. In this disclosure, where pour point is given, unless stated otherwise, it has been determined by standard analytical method ASTM D-5950 or an equivalent analytical method.

"Cloud point" is complementary to pour point and refers to the temperature at which a hydrocarbon fraction (e.g. a lubricant base oil or a pour point depressing lubricant base oil blending component) begins to develop a haze under carefully controlled conditions. In this disclosure, where cloud point is given, unless otherwise stated, it has been determined by standard analytical method ASTM D-5773-95 or an equivalent analytical method.

"Kinematic viscosity" refers to kinematic viscosity as measured by ASTM D-445 or an equivalent analytical method.

"Viscosity Index" (VI) refers to VI as measured by ASTM D-2270-93 (1998) or an equivalent analytical method.

"Equivalent analytical method" means any analytical method which provides results that are substantially the same as results provided by the standard analytical method (i.e. ASTM method).

As used herein, "intermediate pore size" means an effective pore aperture in the range of from about 5.3 to about 6.5 Angstroms when the porous inorganic oxide is in the calcined form.

"Metal" or "active metal" means one or more metals in the elemental state or in some form such as sulfide, oxide and mixtures thereof. Regardless of the state in which the metallic component actually exists, the concentrations are computed as if they existed in the elemental state.

"Molecular weight" refers to molecular weight as determined by ASTM D-2503-02 or an equivalent analytical method.

"Boiling range" refers to a range of 10%-points for the pour point depressing lubricant base oil blending component. In this disclosure, the method used to measure boiling range depends upon whether the boiling range is above 1000° F. or below 1000° F. For hydrocarbons having a boiling range above 1000° F., the boiling range was measured using the standard analytical method D-6352 or an equivalent analytical method. For hydrocarbons having a boiling range below 1000° F., the boiling range was measure using the standard analytical method D-2887 or an equivalent analytical method.

"10%-point" refers to the temperature at which 10 weight % hydrocarbons present within a hydrocarbon fraction vaporize at atmospheric pressure. "Fischer-Tropsch derived" refers to a hydrocarbon stream in which a substantial portion, except for added hydrogen, is derived from a Fischer-Tropsch process regardless of subsequent processing steps.

"Noack volatility" refers to the tendency of hydrocarbon fractions and lubricant base oils to volatilize in service. It is usually tested according to ASTM D5800-05 Procedure B. A more convenient method for calculating Noack volatility and one which correlates well with ASTM D5800-05 is by using a thermogravimetric analyzer (TGA) test by ASTM D6375-05.

"Alkyl branch" refers to a monovalent radical having the general formula $C_nH_{2n+1}$. Typically, "n" in the alkyl branches present in the molecules of the pour point depressing lubricant base oil blending component as described herein is the integer 1, 2, or 3 (i.e. the alkyl is methyl, ethyl, or propyl), although this disclosure does not preclude the presence of some larger branches. The branching properties of the pour point depressing lubricant base oil blending component as described herein can be determined by analyzing a sample of oil using carbon-13 NMR according to the following seven-step process. References cited in the description of the process provide details of the process steps. Steps 1 and 2 are performed only on the initial materials from a new process.

1) Identify the CH branch centers and the $CH_3$ branch termination points using the DEPT Pulse sequence (Doddrell, D. T.; D. T. Pegg; M. R. Bendall, Journal of Magnetic Resonance 1982, 48, 323ff.).

2) Verify the absence of carbons initiating multiple branches (quaternary carbons) using the APT pulse sequence (Patt, S. L.; J. N. Shoolery, Journal of Magnetic Resonance 1982, 46, 535ff.).

3) Assign the various branch carbon resonances to specific branch positions and lengths using tabulated and calculated values (Lindeman, L. P., Journal of Qualitative Analytical Chemistry 43, 1971 1245ff; Netzel, D. A., et. al., Fuel, 60, 1981, 307 ff).

EXAMPLES

| Branch | NMR Chemical Shift (ppm) |
|---|---|
| 2-methyl | 22.5 |
| 3-methyl | 19.1 or 11.4 |
| 4-methyl | 14.0 |
| 4+methyl | 19.6 |
| Internal ethyl | 10.8 |
| Propyl | 14.4 |
| Adjacent methyls | 16.7 |

4) Quantify the relative frequency of branch occurrence at different carbon positions by comparing the integrated intensity of its terminal methyl carbon to the intensity of a single carbon (=total integral/number of carbons per molecule in the mixture). For the unique case of the 2-methyl branch, where both the terminal and the branch methyl occur at the same resonance position, the intensity was divided by two before doing the frequency of branch occurrence calculation. If the 4-methyl branch fraction is calculated and tabulated, its contribution to the 4+methyls must be subtracted to avoid double counting.
5) Calculate the average carbon number. The average carbon number may be determined with sufficient accuracy for lubricant materials by dividing the molecular weight of the sample by 14 (the formula weight of $CH_2$).
6) The number of branches per molecule is the sum of the branches found in step 4.
7) The number of alkyl branches per 100 carbon atoms is calculated from the number of branches per molecule (step 6) times 100/average carbon number.

Measurements can be performed using any Fourier Transform NMR spectrometer. Preferably, the measurements are performed using a spectrometer having a magnet of 7.0 T or greater. In all cases, after verification by Mass Spectrometry, UV or an NMR survey that aromatic carbons were absent, the spectral width was limited to the saturated carbon region, about 0-80 ppm vs. TMS (tetramethylsilane). Solutions of 15-25 percent by weight in chloroform-dl were excited by 45 degrees pulses followed by a 0.8 second acquisition time. In order to minimize non-uniform intensity data, the proton decoupler was gated off during a 10 second delay prior to the excitation pulse and on during acquisition. Total experiment times ranged from 11-80 minutes. The DEPT and APT sequences were carried out according to literature descriptions with minor deviations described in the Varian or Bruker operating manuals.

DEPT is Distortionless Enhancement by Polarization Transfer. DEPT does not show quaternaries. The DEPT 45 sequence gives a signal all carbons bonded to protons. DEPT 90 shows CH carbons only. DEPT 135 shows CH and $CH_3$ up and $CH_2$ 180 degrees out of phase (down). APT is Attached Proton Test. It allows all carbons to be seen, but if CH and $CH_3$ are up, then quaternaries and $CH_2$ are down. The sequences are useful in that every branch methyl should have a corresponding CH. And the methyls are clearly identified by chemical shift and phase. Both are described in the references cited. The branching properties of each sample can be determined by C-13 NMR using the assumption in the calculations that the entire sample was iso-paraffinic. Corrections were not made for n-paraffins or naphthenes, which may have been present in the oil samples in varying amounts. The naphthenes content may be measured using Field Ionization Mass Spectroscopy (FIMS).

FIMS analysis was conducted by placing a small amount (about 0.1 mg.) of the lubricant base oil to be tested in a glass capillary tube. The capillary tube was placed at the tip of a solids probe for a mass spectrometer, and the probe was heated from about 50° C. to 600° C. at 100° C. per minute in a mass spectrometer operating at about $10^{-6}$ torr. The mass spectrometer used was a Micromass Time-of-Flight mass spectrometer. The emitter was a Carbotec 5 um emitter designed for F1 operation. A constant flow of pentaflourochlorobenzene, used as lock mass, was delivered into the mass spectrometer via a thin capillary tube. Response factors for all compound types were assumed to be 1.0, such that weight percent was given directly from area percent.

Process for Making a Pour Point Depressing Lubricant Base Oil Blending Component Disclosed herein is a process for making a pour point depressing lubricant base oil blending component from a plastics feed. Such process comprises a pyrolysis step, a catalytic isomerization dewaxing step, and a recovery step. During the pyrolysis step, a plastics feed is pyrolyzed to provide a pyrolysis effluent. During the catalytic isomerization dewaxing step, at least a portion of the pyrolysis effluent is isomerized with an isomerization dewaxing catalyst to provide an isomerization dewaxing effluent. This isomerization dewaxing effluent is a wax and comprises the pour point depressing lubricant base oil blending component. During the recovery step, the pour point depressing lubricant base oil blending component is recovered.

Figure 1:
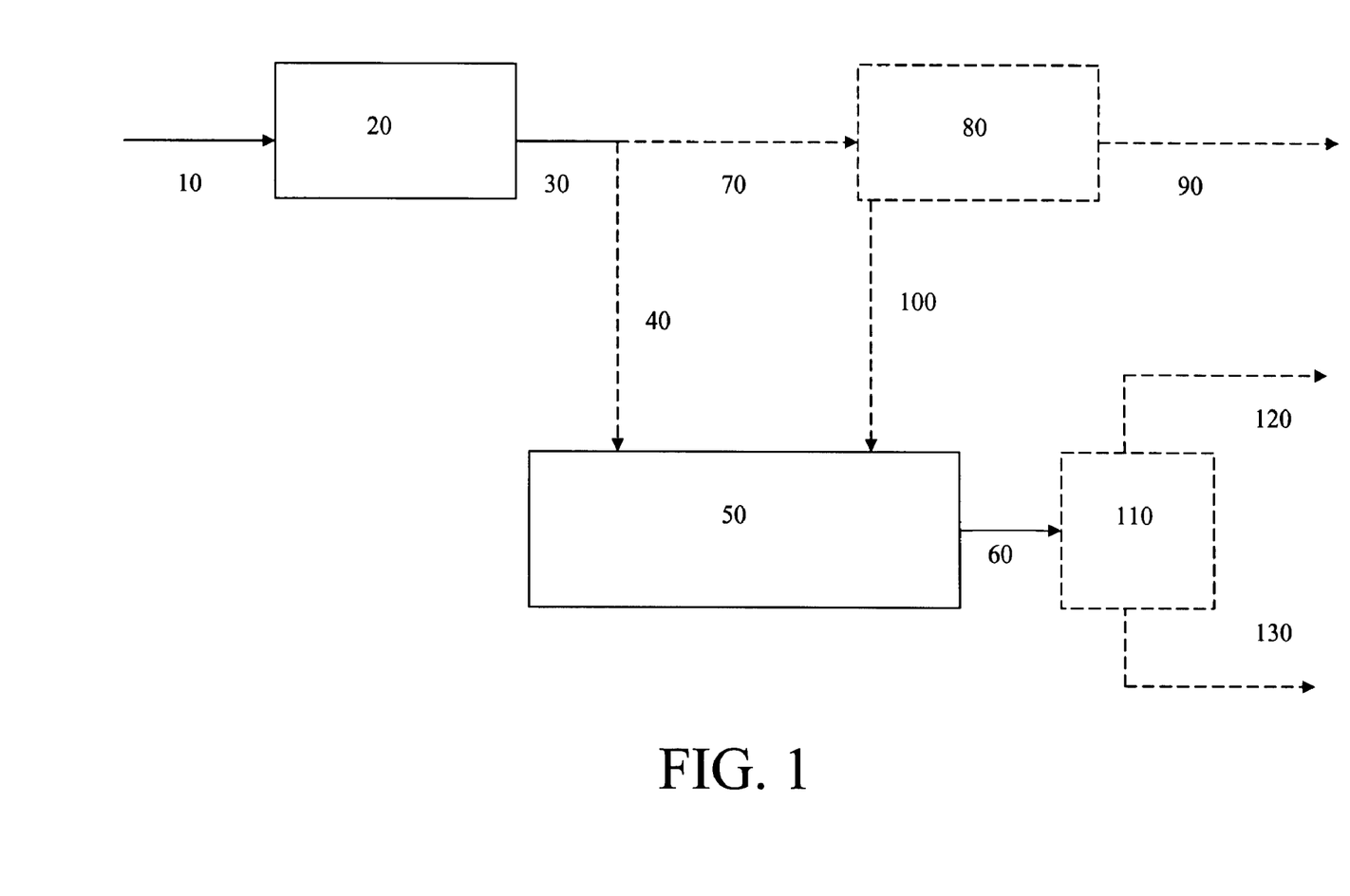
FIG. 1 is a schematic flow diagram of a process for making a pour point depressing lubricant base oil blending component as described herein.

FIG. 1 is a schematic flow diagram of the process, according to its broadest aspect, as described herein. As shown in FIG. 1, a plastics feed 10 enters a pyrolysis zone 20 wherein pyrolysis conditions exist and the feed 10 is pyrolyzed into a pyrolysis effluent 30. At least a portion of the pyrolysis effluent 40 can then enter a catalytic isomerization dewaxing zone 50 wherein the pyrolysis effluent 40 is isomerized into an isomerization dewaxing effluent 60. The isomerization dewaxing effluent 60 comprises the pour point depressing lubricant base oil blending component.

A separation step can take place after the pyrolysis step, after the catalytic isomerization dewaxing step, or after both the pyrolysis step and the catalytic isomerization dewaxing step.

If a separation step takes place after the pyrolysis step, the pyrolysis effluent 30 is first passed via stream 70 to a first separation zone 80. In this separation zone 80, the pyrolysis effluent is separated into two or more streams as shown by reference numerals 90 and 100. One of these streams, the stream with potential to form the pour point depressing lubricant base oil blending component and herein referenced as 100, can then be sent to the catalytic isomerization dewaxing zone 50.

Alternatively or additionally, a separation step can take place after the isomerization dewaxing step. Such separation step is depicted in FIG. 1 by the second separation zone 110. This separation zone 110 can follow the catalytic isomerization dewaxing zone 50 for fractionating the isomerization dewaxing effluent 60 into two or more fractions 120 and 130, thereby recovering the pour point depressing lubricant base oil blending component 130 from the isomerization dewaxing effluent 60. In this case, fraction 120 can be further processed to provide additional valuable products. It should be noted, however, that when a separation step is utilized between the pyrolysis step and the catalytic isomerization dewaxing step, the isomerization dewaxing effluent 60 can be the pour point depressing lubricant base oil blending component such that the separation step after the catalytic isomerization dewaxing step is not necessary.

Pyrolysis Step

The first step in the process for making a pour point depressing lubricant base oil blending component from a plastics feed is a pyrolysis step. It involves contacting a plastics feed in a pyrolysis zone at pyrolysis conditions, where at least a portion of the plastics feed is cracked, thus forming a pyrolysis effluent.

The process as described herein is advantageous because it utilizes the plastics feed. The plastics feed can be selected from the group consisting of waste plastics, virgin plastics, and mixtures thereof.

Waste plastics are a readily available inexpensive feedstock and a serious environmental problem. According to the latest report from the Office of Solid Waste, USEPA, about 62% of plastic packaging in the U.S. is made of polyethylene. The report further states that plastics waste (after recycling) is the fastest growing waste product with about 18 million tons/yr in 1995 compared to only 4 million tons/yr in 1970. Thus, the present process can be not only cost effective, but also environmentally friendly.

Plastics Feed

As stated above, the plastics feed can be selected from the group consisting of waste plastics, virgin plastics, and mixtures thereof. Use of a waste plastics in the plastics feed reduces the cost of the process, however, it is not necessary to utilize waste plastics. As such, the plastics feed can be composed entirely of virgin plastics.

The plastics feed can also contain polyethylene. If the plastics feed contains polyethylene, the polyethylene can be selected from the group consisting of waste polyethylene, virgin polyethylene, and mixtures thereof. Furthermore, if the plastics feed contains polyethylene, the polyethylene can be selected from the group consisting of high-density polyethylene, low-density polyethylene, and mixtures thereof. The plastics feed can comprise between about 80 weight % and about 100 weight % polyethylene, for example, between about 95 weight % and about 100 weight % polyethylene.

In one embodiment of the process as disclosed herein, the plastics feed can further comprise Fischer-Tropsch derived wax. Such Fischer-Tropsch derived wax can include a large amount of material boiling in the 1000° F.+ range and, therefore, can boil mostly above the typical boiling range associated with lubricant base oil (i.e. mostly 650-1000° F.). Since pyrolysis can lower the boiling range of such Fischer-Tropsch derived wax into the boiling range of lubricant base oil, such Fischer-Tropsch derived wax can be included in the plastics feed. It should be appreciated that including Fischer-Tropsch derived wax takes advantage of economies of scale.

Typically, the feed is ground to a suitable size for transport to the pyrolysis zone and then transported to the pyrolysis zone by any conventional means for feeding solids to a vessel. Optionally, the ground plastics feed can be heated and initially dissolved in a solvent. This heated material can then be passed by an auger, or other conventional means, to the pyrolysis zone. After the initial feed, a portion of the heated liquefied feed from the pyrolysis zone can be optionally removed and recycled to the feed to provide a heat source for dissolving the feed.

The plastics feed can contain some contaminants normally associated with waste plastics, e.g., paper labels and metal caps. The feed can also contain chlorine, for example, less than about 20 ppm. In one embodiment of the process as described herein, a substantial portion of any chlorine in the feed can be removed by adding a chlorine scavenger compound (e.g. sodium carbonate) to the feed. Such chlorine scavenger compound reacts with chlorine in the pyrolysis zone to form sodium chloride, which becomes part of the residue at the bottom of the pyrolysis zone. In another embodiment, chlorine adsorbents (e.g. sodium on alumina) can be used in the vapor line downstream from the pyrolysis zone to remove chlorine. In yet another embodiment, the chlorine content of the feed can be reduced to less than about 5 ppm.

Pyrolysis Conditions

Pyrolysis conditions in the pyrolysis zone can include a temperature from about 450° C. to about 700° C., for example, from about 450° C. to about 600° C. Generally, the plastics feed has a residence time in the pyrolysis zone between about 3 minutes and about 1 hour.

Conventional pyrolysis technology teaches operating conditions of above-atmospheric pressures. By adjusting the pressure downward, the yield of a desired product can be controlled. If a pyrolysis effluent of lighter wax is desired, the pressure in the pyrolysis zone should be about atmospheric, for example, from about 0.75 atm to about 1 atm. If a pyrolysis effluent of heavier wax is desired, the pressure in the pyrolysis zone should can be sub-atmospheric, for example, not greater than about 0.75 atmospheres or not greater than about 0.5 atmospheres. Without wishing to be bound by any particular theory, it is believed that, when operating in batch pyrolysis mode with sub-atmospheric pressures in the pyrolysis zone, thermally cracked plastic goes overhead and out of the pyrolysis zone before secondary cracking can occur, resulting in a greater yield of heavier wax.

The pyrolysis zone pressure can be controlled by vacuum or by addition of an inert gas (i.e., acts inert in the pyrolysis zone), e.g., selected from nitrogen, hydrogen, steam, methane or recycled light ends from the pyrolysis zone. The inert gas reduces the partial pressure of the plastic gaseous product. It is the partial pressure which is of interest in controlling the weight of the pyrolysis zone product.

Pyrolysis Effluent

The pyrolysis effluent (liquid portion) comprises n-paraffins and some olefins. The percentage of 1-olefins in the pyrolysis effluent can be from about 25 weight % to about 75 weight %, for example, from about 40 weight % to about 60 weight %. The pyrolysis effluent may also contain undesirable S, N, and aromatics.

Importantly, waxes can be present in the pyrolysis effluent causing the pyrolysis effluent to have a high pour point. More specifically, these waxes are higher molecular weight straight chain normal and slightly branched paraffinic waxes. Therefore, further processing is typically necessary to convert the pyrolysis effluent to a less waxy composition having a lower pour point and including a fraction suitable for use as a pour point depressing lubricant base oil blending component.

Catalytic Isomerization Dewaxing Step

Another step in the process for making a pour point depressing lubricant base oil blending component is a catalytic isomerization dewaxing step. Catalytic isomerization dewaxing is a form a catalytic dewaxing. It achieves a lower pour point by isomerizing the wax, rather than by removing the wax or cracking the wax. Isomerization dewaxing is taught in U.S. Pat. No. 5,135,638, which document is incorporated by reference herein in its entirety. The catalytic isomerization dewaxing step of the process as described herein can be conducted as taught in U.S. Pat. No. 5,135,638, which disclosure is incorporated herein by reference in its entirety.

The catalytic isomerization dewaxing step involves isomerizing a portion or all of the pyrolysis effluent with an isomerization dewaxing catalyst. The catalytic isomerization dewaxing step reduces, substantially eliminates, or completely eliminates waxes in the pyrolysis effluent to provide an isomerization dewaxing effluent having a lower pour point and a high VI. The isomerization dewaxing effluent comprises a fraction having an adequately low pour point, an adequately high VI, and an adequately high boiling point temperature such that it is useful as a pour point depressing lubricant base oil blending component. The pour point depressing lubricant base oil blending component may also be useful as a VI improver.

Unlike solvent dewaxing which is a separations process, catalytic isomerization dewaxing converts n-paraffins to iso-paraffins. This process can create an isomerization dewaxing effluent with a reduced pour point and higher VI than a process whereby waxes are removed by cracking alone. Thus, the catalytic isomerization dewaxing step of the present process is advantageous because a higher wax conversion results in greater pour point reduction.

However, one skilled in the art will recognize that a higher wax conversion results in a higher yield loss. Therefore, in isomerizing at least a portion of the pyrolysis effluent, pour point must be balanced against yield.

Isomerization Dewaxing Effluent

The isomerization dewaxing effluent comprises a fraction having a boiling range between about 900° F. and about 1100° F., for example, between about 950° F. and about 1100° F. Such fraction can have a kinematic viscosity at 100° C. of between about 12 cSt and about 18 cSt. Such fraction can further have a pour point in the range of about −15° C. to about 0° C. More particularly, such fraction is the pour point depressing lubricant base oil blending component. This and any other fractions can be separated by conventional separation processes. Any other fractions (e.g. lower-boiling or lighter fractions) can be processed to produce other valuable products, such as the lubricant base oil whose lubricating properties are improved according to the method as described herein.

The pour point depressing lubricant base oil blending component can have a VI in the range of about 130 to about 180. Thus, it can also increase the VI of a finished lubricant.

The present process is advantageous over processes producing a pour point depressing lubricant base oil blending component from Fischer-Tropsch wax because the pour point depressing lubricant base oil blending component as disclosed herein is a substantial portion of the isomerization dewaxing effluent. Generally processing of Fischer-Tropsch derived wax only provides a product having a pour point depressing lubricant base oil blending component in an amount of less than 10 weight %. However, the process as described herein can provide a product including a greater percentage of pour point depressing lubricant base oil blending component. This is due to the fact that the molecular weight range of the plastics feed can be much greater than, typically several thousand or more greater than, the molecular weight range of Fischer-Tropsch derived wax. Thus, by adjusting the pyrolysis conditions, it is possible to produce a significant amount of the pour point depressing lubricant base oil blending component.

The pour point depressing lubricant base oil blending component can be at least about 10 weight % of the isomerization dewaxing effluent. Alternatively, the pour point depressing lubricant base oil blending component can be at least about 20 weight % of the isomerization dewaxing effluent. As another alternative, the pour point depressing lubricant base oil blending component can be at least about 30 weight % of the isomerization dewaxing effluent.

The present process is also advantageous over other processes producing a pour point depressing lubricant base oil blending component because waste plastics, which are inexpensive and readily available, can be incorporated into the plastics feed.

Isomerization Dewaxing Catalyst

Isomerization catalytic dewaxing includes any solid catalyst or mixture of solid catalyst capable of isomerization dewaxing. The catalyst can be an intermediate pore size molecular sieve or a mixture of more than one type of intermediate pore size molecular sieve. Molecular sieves having intermediate pore size tend to have unique molecular sieving characteristics. Unlike small pore zeolites such as erionite and chabazite, they will allow hydrocarbons having some branching into the molecular sieve void spaces. Unlike larger pore zeolites such as the faujasites and mordenites, they can differentiate between n-alkanes and slightly branched alkanes, and larger branched alkanes having, for example, quaternary carbon atoms.

The effective pore size of the molecular sieves can be measured using standard adsorption techniques and hydrocarbonaceous compounds of known minimum kinetic diameters. See Breck, *Zeolite Molecular Sieves,* 1974 (especially Chapter 8); Anderson et al., *J. Catalysis* 58, 114 (1979); and U.S. Pat. No. 4,440,871, which pertinent portions of these documents are incorporated by reference herein. In performing adsorption measurements to determine pore size, standard techniques are used. It is convenient to consider a particular molecule as excluded if it does not reach at least 95% of its equilibrium adsorption value on the molecular sieve in less than about 10 minutes (p/po=0.5; 25° C.).

Intermediate pore size molecular sieves will typically admit molecules having kinetic diameters of 5.3 to 6.5 Angstroms with little hindrance. Examples of such compounds (and their kinetic diameters in Angstroms) are: n-hexane (4.3), 3-methylpentane (5.5), benzene (5.85), and toluene (5.8). Compounds having kinetic diameters in the range of 6 to 6.5 Angstroms can be admitted into the pores, depending on the particular sieve, but do not penetrate as quickly and in some cases are effectively excluded. Compounds having kinetic diameters in the range of 6 to 6.5 Angstroms include: cyclohexane (6.0), 2,3-dimethylbutane (6.1), and m-xylene (6.1). Generally, compounds having kinetic diameters of greater than about 6.5 Angstroms do not penetrate the pore apertures and thus are not absorbed into the interior of the molecular sieve lattice. Examples of such larger compounds include: o-xylene (6.8), 1,3,5-trimethylbenzene (7.5), and tributylamine (8.1).

In one embodiment, the effective pore size range is from about 5.5 to about 6.2 Angstroms. While the effective pore size as discussed above is important to the practice of the invention, not all intermediate pore size molecular sieves having such effective pore sizes are advantageously usable in the practice of the process as disclosed herein. Indeed, it is necessary that the intermediate pore size molecular sieve catalysts used in the practice of the process as disclosed herein have a very specific pore shape and size as measured by X-ray crystallography. First, the intracrystalline channels must be parallel and must not be interconnected. Such channels are conventionally referred to as 1-D diffusion types or more shortly as 1-D pores. The classification of intrazeolite channels such as 1-D, 2-D, and 3-D is set forth by R. M. Barrer in *Zeolites, Science and Technology,* edited by F. R. Rodrigues, L. D. Rollman and C. Naccache, NATO ASI Series, 1984, which classification is incorporated in its entirety by reference herein (see particularly page 75.) Known 1-D zeolites include cancrinite, hydrate, laumontite, mazzite, mordenite and zeolite L.

None of the above listed 1-D pore zeolites, however, satisfies the second essential criterion for catalysts useful in the practice of the present process. This second essential criterion is that the pores must be generally oval in shape, by which is meant the pores must exhibit two unequal axes referred to herein as a minor axis and a major axis. The term oval as used herein is not meant to require a specific oval or elliptical shape but rather to refer to the pores exhibiting two unequal axes. In particular, the 1-D pores of the catalysts useful in the practice of the present process must have a minor axis between about 3.9 Angstroms and about 4.8 Angstroms and a major axis between about 5.2 Angstroms and about 7.0 Angstroms as determined by conventional X-ray crystallography measurements.

The catalyst used in the isomerization process has an acidic component and a platinum and/or palladium hydrogenation component. In accordance with one embodiment, the acidic component can suitably comprise an intermediate pore size silicoaluminophosphate molecular sieve which is described in U.S. Pat. No. 4,440,871, the pertinent disclosure of which is incorporated herein by reference.

The intermediate pore size silicoaluminophosphate molecular sieve can be SAPO-11, for example, SM-3 (as taught in U.S. Pat. No. 5,208,005, which document is incorporated by reference in its entirety herein). Other suitable intermediate pore size silicoaluminophosphate molecular sieves are SAPO-31 and SAPO-41. The process as described herein can also be carried out using a catalyst comprising an intermediate pore size non-zeolitic molecular sieve containing $AlO_2$ and $PO_2$ tetrahedral oxide units, and at least one Group VIII metal. Exemplary suitable intermediate pore size non-zeolitic molecular sieves are set forth in European Patent Application No. 158,977, which is incorporated by reference in its entirety herein.

The group of intermediate pore size zeolites of the present process includes ZSM-22, ZSM-23, SSZ-32 (as taught in U.S. Pat. No. 5,252,527, which document is incorporated herein by reference in its entirety), and ZSM-35. These catalysts are generally considered to be intermediate pore size catalysts based on the measure of their internal structure as represented by their Constraint Index. Zeolites which provide highly restricted access to and egress from their internal structure have a high value for the Constraint Index, while zeolites which provide relatively free access to the internal zeolite structure have a low value for their Constraint Index. The method for determining Constraint Index is described fully in U.S. Pat. No. 4,016,218, which is incorporated by reference in its entirety herein.

Those zeolites exhibiting a Constraint Index value within the range of from about 1 to about 12 are considered to be intermediate pore size zeolites. Zeolites which are considered to be in this range include ZSM-5, ZSM-11, etc. Upon careful examination of the intermediate pore size zeolites, however, it has been found that not all of them are efficient as a catalyst for isomerization of a paraffin-containing feedstock which are high in $C_{20}$+ paraffins, for example, which are high in $C_{22}$+ paraffins. In particular, it has been found that the group including ZSM-22, ZSM-23 and ZSM-35 used in combination with Group VIII metals can provide a means whereby a hydrocarbon feedstock having a paraffinic content with molecules of 20 carbon atoms or more undergoes unexpectedly efficient isomerization without destroying the ultimate yield of the feedstock.

It is known to use prior art techniques for formation of a great variety of synthetic aluminosilicates. These aluminosilicates have come to be designated by letter or other convenient symbols. One of the suitable zeolites of the present process, ZSM-22, is a highly siliceous material which includes crystalline three-dimensional continuous framework silicon containing structures or crystals which result when all the oxygen atoms in the tetrahedra are mutually shared between tetrahedral atoms of silicon or aluminum, and which can exist with a network of mostly $SiO_2$, i.e., exclusive of any intracrystalline cations. The description of ZSM-22 is set forth in full in U.S. Pat. Nos. 4,556,477; 4,481,177, and European Patent Application No. 102,716. These documents are incorporated by reference in their entireties herein.

Furthermore, the original cations of the as-synthesized ZSM-22 can be replaced at least in part by other ions using conventional ion exchange techniques. It can be necessary to pre-calcine the ZSM-22 zeolite crystals prior to ion exchange. The replacement ions are those taken from Group VIII of the Periodic Table, especially platinum, palladium, iridium, osmium, rhodium and ruthenium.

ZSM-22 freely sorbs normal hexane and has a pore dimension greater than about 4 Angstroms. In addition, the structure of the zeolite provides constrained access to larger molecules. The Constraint Index for ZSM-22 as determined by the procedure set forth in U.S. Pat. No. 4,016,246, which document is incorporated by reference in its entirety herein, has been determined to be from about 2.5 to about 3.0.

Another zeolite which can be used is the synthetic crystalline aluminosilicate referred to as ZSM-23, disclosed in U.S. Pat. No. 4,076,842, the contents of which are incorporated by reference in their entirety herein. As with ZSM-22, the original cations of as-synthesized ZSM-23 can be replaced in accordance with techniques well known in the art, at least in part by ionic exchange with other cations. In the present process, these cations include the Group VIII metals as set forth above. Other molecular sieves which can be used include, for example, Theta-1, as described in U.S. Pat. Nos. 4,533,649 and 4,836,910, both of which are incorpoated in their entireties by reference herein, Nu-10, as described in European Patent Application No. 065,400, which is incorporated by reference in its entirety herein, and SSZ-20 as described in U.S. Pat. No. 4,483,835, which is incorporated by reference in its entirety herein. Yet another intermediate pore size zeolite which has been found to be successful is ZSM-35, which is disclosed in U.S. Pat. No. 4,016,245, the contents of which are incorporated by reference in their entirety herein. The original cations of the as-synthesized ZSM-35 can be removed using techniques well known in the art, which includes ion exchange with other cations. In the present process, the cation exchange is used to replace the as-synthesized cations with the Group VIII metals set forth above.

The intermediate pore size molecular sieve is used in admixture with at least one Group VIII metal. The Group VIII metal can be selected from the group consisting of at least one of platinum and palladium and, optionally, other catalytically active metals such as molybdenum, nickel, vanadium, cobalt, tungsten, zinc and mixtures thereof. In one embodiment, the Group VIII metal is selected from the group consisting of at least one of platinum and palladium. The amount of metal can range from about 0.01 weight % to about 10 weight % of the molecular sieve, for example, from about 0.2 weight % to about 5 weight % of the molecular sieve. The techniques of introducing catalytically active metals into a molecular sieve are disclosed in the literature, and preexisting metal incorporation techniques and treatment of the molecular sieve to form an active catalyst such as ion exchange, impregnation or occlusion during sieve preparation are suitable for use in the present process. Such techniques are disclosed in U.S. Pat. Nos. 3,236,761; 3,226,339; 3,236,762; 3,620,960; 3,373,109;

4,202,996; 4,440,781 and 4,710,485, which documents are incorporated by reference in their entireties herein.

Relatively small crystal size catalyst can be utilized in practicing the present process. In one embodiment, the average crystal size is no greater than about 10 mu. In another embodiment, the average crystal size is no greater than about 5 mu. In yet another embodiment, the average crystal size is no greater than about 1 mu. In still another embodiment, the average crystal size is no greater than about 0.5 mu.

The catalyst can also contain metals which reduce the number of strong acid sites on the catalyst and thereby lower the selectivity for cracking versus isomerization. In one embodiment of the process as described herein, the metals are Group IIA metals such as magnesium and calcium.

Strong acidity can also be reduced by introducing nitrogen compounds, e.g., $NH_3$ or organic nitrogen compounds, into the feed; however, the total nitrogen content should be less than 50 ppm, for example, less than 10 ppm. The physical form of the catalyst depends on the type of catalytic reactor employed and can be in the form of a granule or powder, and is desirably compacted into a more readily usable form (e.g., larger agglomerates), usually with a silica or alumina binder for fluidized bed reaction, or pills, prills, spheres, extrudates, or other shapes of controlled size to accord adequate catalyst-reactant contact.

The catalyst can be employed either as a fluidized catalyst, or in a fixed or moving bed, and in one or more reaction stages.

The intermediate pore size molecular sieve used in the catalytic isomerization dewaxing step provides selective conversion of the waxy components to non-waxy components. During processing, isomerization of the paraffins occurs to reduce the pour point of the oil below that of the feed and form lube oil boiling range materials which contribute to a low pour point product having excellent viscosity index properties. Because of the selectivity of the intermediate pore size molecular sieve, the yield of low boiling products is reduced, thereby preserving the economic value of the feedstock.

The intermediate pore size molecular sieve catalyst can be manufactured into a wide variety of physical forms. The molecular sieves can be in the form of a powder, a granule, or a molded product, such as an extrudate having a particle size sufficient to pass through a 2-mesh (Tyler) screen and be retained on a 40-mesh (Tyler) screen. In cases wherein the catalyst is molded, such as by extrusion with a binder, the silicoaluminophosphate can be extruded before drying, or dried or partially dried, and then extruded.

The molecular sieve can be composited with other materials resistant to temperatures and other conditions employed in the catalytic isomerization dewaxing zone. Such matrix materials include active and inactive materials and synthetic or naturally occurring zeolites as well as inorganic materials such as clays, silica and metal oxides. The latter can be either naturally occurring or in the form of gelatinous precipitates, sols or gels including mixtures of silica and metal oxides. Inactive materials suitably serve as diluents to control the amount of conversion in the catalytic isomerization dewaxing step so that products can be obtained economically without employing other means for controlling the rate of reaction. The molecular sieve can be incorporated into naturally occurring clays, e.g., bentonite and kaolin. These materials, i.e., clays, oxides, etc., function, in part, as binders for the catalyst. It is desirable to provide a catalyst having good crush strength because in petroleum refining, the catalyst is often subjected to rough handling, which tends to break the catalyst down into powderlike materials which cause problems in processing.

Naturally occurring clays which can be composited with the molecular sieve include the montmorillonite and kaolin families, which families include the sub-bentonites, and the kaolins commonly known as Dixie, McNamee, Georgia and Florida clays or others in which the main mineral constituent is halloysite, kaolinite, diokite, nacrite or anauxite. Fibrous clays such as halloysite, sepiolite and attapulgite can also be use as supports. Such clays can be used in the raw state as originally mined or initially subjected to calcination, acid treatment or chemical modification.

In addition to the foregoing materials, the molecular sieve can be composited with porous matrix materials and mixtures of matrix materials such as silica, alumina, titania, magnesia, silica-alumina, silica-magnesia, silica-zirconia, silica-thoria, silica-beryllia, silica-titania, titania-zirconia as well as ternary compositions such as silica-alumina-thoria, silica-aluminatitania, silica-alumina-magnesia and silica-magnesia-zirconia. The matrix can be in the form of a cogel.

The catalyst used in the present process can also be composited with other zeolites such as synthetic and natural faujasites, (e.g., X and Y) erionites, and mordenites. It can also be composited with purely synthetic zeolites such as those of the ZSM series. The combination of zeolites can also be composited in a porous inorganic matrix.

Catalytic Isomerization Dewaxing Conditions

The catalytic isomerization dewaxing step of the process as described herein can be conducted by contacting the feed to the catalytic isomerization dewaxing zone with a fixed stationary bed of catalyst, with a fixed fluidized bed, or with a transport bed. In one embodiment, the configuration is a trickle-bed operation in which the feed is allowed to trickle through a stationary fixed bed, for example, in the presence of hydrogen.

The conditions employed in the catalytic isomerization dewaxing zone depend on the feed used and the desired pour point of the effluent. Generally, the temperature is from about 200° C. to about 475° C., for example, from about 250° C. to about 450° C. The pressure is typically from about 15 psig to about 2000 psig, for example, from about 50 psig to about 1000 psig or from about 100 psig to about 600 psig. The process can be carried out at low pressure. The LHSV can be from about 0.1 to about 20, for example, from about 0.1 to about 5 or from about 0.1 to about 1.0. Low pressure and low liquid hourly space velocity provide enhanced isomerization selectivity which results in more isomerization and less cracking of the feed thus producing an increased yield.

It has been found that when the pour point depressing lubricant base oil blending component is used to improve the lubricating properties (e.g. pour point) of a lubricant base oil according to the method as described herein, the pour point of the lubricant base oil blend can be reduced to below both the pour point of the pour point depressing lubricant base oil blending component and the pour point of the lubricant base oil. As such, it may not be necessary to reduce the pour point of the pour point depressing lubricant base oil blending component to the target pour point of the lubricant base oil blend. Accordingly, the actual degree of isomerization may not need to be as high as might otherwise be expected, and the catalytic isomerization dewaxing zone may be operated at a lower severity with less cracking and less yield loss. Moreover, it has been found that the stream entering the catalytic isomerization dewaxing zone should not be over isomerized or its ability to produce a high boiling fraction suitable for use as a pour point depressing lubricant base oil blending component will be compromised.

In one embodiment, hydrogen is present in the catalytic isomerization dewaxing zone during the catalytic isomerization dewaxing step. The hydrogen to feed ratio can be from about 500 to about 30,000 SCF/bbl, for example, from about 1,000 to about 10,000 SCF/bbl. Generally, hydrogen will be separated from the effluent and recycled to the catalytic isomerization dewaxing zone.

Optional Hydrofinishing Step

It is may be desirable to use mild hydrogenation referred to as hydrofinishing after the catalytic isomerization dewaxing step. Accordingly, the isomerization dewaxing effluent optionally may be hydrofinished to produce a more stable product comprising the pour point depressing lubricant base oil blending component. Thus, an optional hydrofinishing step may follow the catalytic isomerization dewaxing step.

Hydrofinishing is typically conducted at temperatures ranging from about 190° C. to about 340° C., at pressures from about 400 psig to about 3000 psig, at space velocities (LHSV) from about 0.1 to about 20, and hydrogen recycle rates of from about 400 to about 1500 SCF/bbl.

Suitable hydrogenation catalysts include conventional metallic hydrogenation catalysts, particularly the Group VIII metals such as cobalt, nickel, palladium and platinum. The metals are typically associated with carriers such as bauxite, alumina, silica gel, silica-alumina composites, and crystalline aluminosilicate zeolites. In one embodiment of the process as described herein, the hydrogenation metal is palladium. If desired, non-noble Group VIII metals can be used with molybdates. Metal oxides or sulfides can be used. Suitable catalysts are disclosed in U.S. Pat. Nos. 3,852,207; 4,157,294; 3,904,513 and 4,673,487, which documents are incorporated by reference in their entireties herein.

Pour Point Depressing Lubricant Base Oil Blending Component

As described above, the process as described herein produces a pour point depressing lubricant base oil blending component from a plastics feed. The pour point depressing lubricant base oil blending component is a high boiling fraction with a boiling range of approximately 900-1100° F. and a pour point of approximately −15-0° C. The pour point depressing lubricant base oil blending component can also have a kinematic viscosity at 100° C. of approximately 12-18 cSt.

When added in small amounts to a lubricant base oil, for example, a Group II or a Group III light or medium neutral lubricant base oil, such high boiling fraction is useful as a pour point depressant. It has been discovered that when such high boiling fraction is added to a lubricant base oil, the pour point of the finished lubricant can be less than both the pour point of the high boiling fraction (a.k.a. pour point depressing lubricant base oil blending component) and the pour point of the lubricant base oil. Accordingly, it is usually not necessary to reduce the pour point of the pour point depressing lubricant base oil blending component to the target pour point of the finished lubricant. The actual degree of isomerization of the pour point depressing lubricant base oil blending component may not be as high as might otherwise be expected. In general, the average degree of branching in the molecules of the pour point depressing lubricant base oil blending component can be at least 5 alkyl-branches per 100 carbon atoms. In one embodiment, the average degree of branching can be between about 6 and about 8 alkyl-branches per 100 carbon atoms.

The pour point depressing lubricant base oil blending component can also have a VI of approximately 130-180. As a result, the pour point depressing lubricant base oil blending component can also be useful as a VI improver when added in small amounts to a lubricant base oil. Using the pour point depressing lubricant base oil blending component as a VI improver significantly reduces the amount of conventional viscosity index improver that must be added to a lubricant base oil to produce a finished lubricant. For example, it has been found that the pour point depressing lubricant base oil blending component can be substituted for up to 20% of the amount of conventional VI improver used in automotive engine oil formulations. This is advantageous because use of the pour point depressing lubricant base oil blending component can decrease cost associated with the use of conventional VI improver. Since conventional VI improver contributes to engine deposits, this is further advantageous because substituting the pour point depressing lubricant base oil blending component for some of the VI improver can reduce such deposits leaving engines cleaner for longer periods of time.

Additionally, the pour point depressing lubricant base oil blending component has the potential to lower the sulfur content of a lubricant base oil to which it is added. Blending the pour point depressing lubricant base oil blending component with a lubricant base oil can lower the sulfur content of the lubricant base oil. For example, the pour point depressing lubricant base oil can be blended with a conventional petroleum derived lubricant base oil having a marginal sulfur content that almost meets sulfur specifications so that the lubricant base oil will, in fact, meet sulfur specifications. This property is especially important for Group II lubricant base oils, which must contain 300 ppm or less sulfur.

Furthermore, the pour point depressing lubricant base oil blending component can be characterized by a very low Noack volatility. Thus, the pour point depressing lubricant base oil blending component has the potential to lower the Noack volatility of a lubricant base oil with which it is blended. Whether the pour point depressing lubricant base oil blending component will, in fact, lower the Noack volatility depends upon the amount of pour point depressing lubricant base oil blending component utilized.

The average molecular weight of the pour point depressing lubricant base oil blending component can be at least 600. For example, the average molecular weight of the pour point depressing lubricant base oil blending component can be at least 700 or at least 800.

In one embodiment, the pour point depressing lubricant base oil blending component has a paraffin content of at least about 30 weight %, for example, at least about 40 weight % or at least about 50 weight %.

The pour point depressing lubricant base oil blending component differs from pour point depressants known in art in that it is essentially polar-free. One of the advantages of the pour point depressing lubricant base oil blending component as described herein is that it is not an additive in the conventional sense. Rather, it is a high boiling fraction recovered after pyrolysis and catalytic isomerization dewaxing of a plastics feed. Therefore, it does not lend itself to problems that have been associated with the use of conventional additives.

The pour point depressing lubricant base oil blending component is also an improvement over other pour point depressants because it can be produced from waste plastics, a readily available and inexpensive source.

Method for Improving the Lubricating Properties of a Lubricant Base Oil

Also disclosed herein is a method for improving the lubricating properties of a lubricant base oil. The method comprises (1) making a pour point depressing lubricant base oil blending component according the process as described herein and (2) blending the pour point depressing lubricant base oil blending component with a lubricant base oil. Blending the pour point depressing lubricant base oil blending component with a lubricant base oil provides a lubricant base oil blend.

Blending methods are known in the art. Any conventional blending method can be used.

Lubricant Base Oil Blend

The lubricant base oil blend produced by the above method can be used like any lubricant base oil. For example, the lubricant base oil blend as described herein can be used as engine oil.

The lubricant base oil blend has a lower pour point than the pour point of the lubricant base oil. The lubricant base oil blend can have a pour point at least 3° C. below the pour point of the lubricant base oil. Alternatively, the lubricant base oil blend can have a pour point at least 6° C. below the pour point of the lubricant base oil. As another alternative, the lubricant base oil blend can have a pour point at least 9° C. below the pour point of the lubricant base oil. The lubricant base oil blend can have a pour point below about −9° C. Alternatively, the lubricant base oil blend can have a pour point about −15° C. or less.

Additionally, the lubricant base oil blend can have a VI higher than the VI of the lubricant base oil. For example, the lubricant base oil blend can have a VI at least 3 numbers higher than the VI of the lubricant base oil. The lubricant base oil blend can have a VI greater than about 90. In one embodiment, the VI of the lubricant base oil blend can be about 100 or higher. In another embodiment, the VI of the lubricant base oil blend can be higher than 110.

The lubricant base oil blend can have a kinematic viscosity at 100° C. above about 3 cSt. In one embodiment, the lubricant base oil blend has a kinematic viscosity at 100° C. between about 3 cSt and about 8 cSt. In another embodiment, the lubricant base oil blend has a kinematic viscosity at 100° C. between about 3 cSt and about 7 cSt.

If the lubricant base oil blend is intended for use as an engine oil, the cloud point can be 0° C. or less.

Prior to blending, the degree of decrease of the pour point may not be predicted by observing the pour points of the lubricant base oil and the pour point depressing lubricant base oil blending component, respectively. The pour point of the lubricant base oil blend may not be merely the proportional average of the pour points of the lubricant base oil and the pour point depressing lubricant base oil blending component. Rather, a premium may be observed meaning that the pour point of the lubricant base oil blend may be significantly lower than would be expected, and in many cases, may be lower than the pour points of the blend's individual components. This can be true even when the pour point depressing blending component comprises 3.5 weight % or less of the lubricant base oil blend.

Moreover, prior to blending, the degree of increase in VI may not be predicted by observing the VIs of the lubricant base oil and the pour point depressing lubricant base oil blending component, respectively. As with the pour point, the VI of the lubricant base oil blend may not be merely the proportional average of the VIs of the lubricant base oil and the pour point depressing lubricant base oil blending component. Instead, a premium may be observed meaning that the VI of the lubricant base oil blend may be significantly higher than would be expected, and in many cases, may be higher than the VIs of the blend's individual components. Such an increase in VI makes it possible to produce a Group III lubricant base oil, i.e., a lubricant base oil having a VI greater than 120, from a Group II plus lubricant base oil, i.e., a lubricant base oil having a VI between 110 and 120. A Group II plus lubricant base oil may also be prepared from a Group II lubricant base oil having a VI below about 110.

The desired cloud point of the lubricant base oil blend can determine the amount of pour point depressing lubricant base oil blending component in the lubricant base oil blend. It is usually desirable to maintain as low a cloud point as possible for the lubricant base oil blend. Therefore, the minimum amount of the pour point depressing lubricant base oil blending component sufficient to meet the desired pour point of the lubricant base oil blend can be blended with the lubricant base oil.

The desired VI of the lubricant base oil blend can also determine the amount of pour point depressing lubricant base oil blending component in the lubricant base oil blend. As stated above, the pour point depressing lubricant base oil component not only lowers the pour point of the lubricant base oil blend, but can also increase the viscosity of the lubricant base oil blend. Therefore, the amount of the pour point depressing lubricant base oil component blended with the lubricant base oil can be limited by the desired viscosity of the lubricant base oil blend.

The lubricant base oil blend can comprise about 15 weight % or less of the pour point depressing lubricant base oil blending component. Alternatively, the lubricant base oil blend can comprise 7 weight % or less of the pour point depressing lubricant base oil blending component. As another alternative, the lubricant base oil blend can comprise 3.5 weight % or less of the pour point depressing lubricant base oil blending component.

The lubricant base oil blends prepared according to the method as described herein are compatible with conventional pour point depressants Similarly, the lubricant base oil blends prepared according to the method as described herein are compatible with conventional VI improvers. Therefore, additives intended to further improve pour point and/or VI can be added, if necessary, to the lubricant base oil blends to prepare finished lubricants. Pour point depressants generally can comprise between about 0.1 and about 1 weight % of the finished lubricant. VI improvers generally can comprise between about 0.1 and about 1.0 weight % of the finished lubricant.

Lubricant Base Oil

The lubricant base oil can be either a conventional petroleum-derived lubricant base oil, a synthetic lubricant base oil, a mixture of conventional petroleum-derived lubricant base oils, a mixture of synthetic lubricant base oils, or a mixture conventional petroleum-derived lubricant base oil(s) and synthetic lubricant base oil(s). An exemplary synthetic lubricant base oil is a lubricant base oil recovered from a Fischer-Tropsch synthesis. The lubricant base oil can be a light neutral lubricant base oil or a medium neutral lubricant base oil. The lubricant base oil can also be a Group II lubricant base oil or a Group III lubricant base oil.

The lubricant base oil can have a kinematic viscosity at 100° C. between about 2.5 cSt and about 7 cSt, for example, between about 3 cSt and about 7 cSt.

The 10%-point of the lubricant base oil can be between about 625° F. and about 790° F. The 90%-point of the lubricant base oil can be between about 725° F. and about 950° F., for example, between about 725° F. and about 900° F.

Since the pour point depressing lubricant base oil blending component can raise the cloud point of the lubricant base oil, the cloud point of the lubricant base oil can be lower than the target cloud point of the lubricant base oil blend in order to allow for some rise in the cloud point. Lubricant base oil blends used to produce certain finished lubricants often require a cloud point of 0° C. or less. Thus, for such lubricant base oil blends, the cloud point of the lubricant base oil can be below 0° C.

The method of improving the lubricating properties of a lubricant base oil as described herein is particularly advantageous when used with lubricant base oils having a VI of less than 110, since such lubricant base oils are usually unsuitable for preparing high quality lubricants without the addition of significant amounts of VI improvers. Due to the VI increase which can be observed when using the pour point depressing lubricant base oil blending component as described herein, the VI of marginal lubricant base oils may be significantly improved without the use of conventional additives. The pour point depressing lubricant base oil blending component as described herein, by increasing the VI, may make it possible to upgrade Group II lubricant base oils having a VI of less than 110 up to a Group II plus lubricant base oils or upgrade Group II plus lubricant base oils to Group III lubricant base oils.

The following examples are intended to be illustrative, but non-limiting.

EXAMPLES

Example 1

50 weight % low density polyethylene/50 weight % Fischer-Tropsch wax was subjected to pyrolysis at 975° F., atmospheric pressure, and 1 LHSV (one hour of residence time, based on plastic). The yields are given in Table I, showing over 30 wt % in the 900-1100° F. range. The liquid product of pyrolysis was distilled at about 650° F. and the 650° F.+ bottoms were then subjected to isomerization dewaxing to provide an isomerization dewaxed product with over 20 weight % in the 900-1100° F. range.

TABLE I

| Product, weight % | |
|---|---|
| $C_1$ | 0.2 |
| $C_2$ paraffin | 0.4 |
| $C_2$ olefin | 0.6 |
| $C_3$-$C_4$ paraffin | 1.2 |
| $C_3$-$C_4$ olefin | 1.8 |
| $C_4$-total | 4.2 |
| $C_5$-350° F. | 9.9 |
| 350-650° F. | 20.0 |
| 650° F.+ | 65.9 |
| 725° F.+ | 57.5 |
| 1000° F.+ | 6.9 |
| Cut 1 | |
| Yield, weight % | 17.1 |
| Sim. Dist., ° F., LV % | |
| ST/5 | 95/199 |
| 10/30 | 207/300 |
| 50 | 379 |
| 70/90 | 452/546 |
| 95/End Point | 597/690 |
| Bottoms | |
| Yield, weight % | 76.0 |
| Sim. Dist., ° F., LV % | |
| ST/5 | 432/571 |
| 10/30 | 623/755 |
| 50 | 853 |
| 70/90 | 923/993 |
| 95/End Point | 1024/1097 |

Example 2

High-density polyethylene was subjected to pyrolysis at 650° C. and 6 minutes residence time at atmospheric pressure. The 650° F.+ product was hydrotreated over a Ni—Mo on alumina catalyst to remove residual nitrogen compounds. This oil was then isomerization dewaxed over a Pt on SAPO-11 catalyst at 665° F., 1950 psig, and 0.5 LHSV (6 minutes of residence time). This gave an isomerization dewaxed product with close to 18 weight % in the 900-1100° F. boiling range, as indicated in Table II. More specifically, the 900-1100° F. boiling range fraction was about 30 weight % of the 700-1000° F. fraction and nearly all of the 1000° F.+ fraction.

In Table II, overall yields from plastic mean the yields based on the plastics feed and take into account both the yield in the pyrolyzer and the yield in subsequent steps, including isomerization.

TABLE II

| | In IDW | Overall from Plastic |
|---|---|---|
| Yields, weight % | | |
| $C_4$- | 3.8 | 10.3 |
| $C_5$-300° F. | 6.2 | 8.2 |
| 300-500° F. | 16.6 | 15.0 |
| 500-700° F.+ | 29.6 | 26.8 |
| 700° F.+ | 43.8 | 39.7 |
| 700° F.– Overhead Liquid | | |
| Yield, weight % | 50.0 | 45.3 |
| Gravity, API | 51.3 | |
| Sim. Dist., ° F., LV % | | |
| ST/5 | 121/239 | |
| 10/30 | 287/416 | |
| 50 | 506 | |
| 70/90 | 590/675 | |
| 95/End Point | 700/998 | |
| 700-1000° F. | | |
| Yield, weight % | 31.9 | 28.9 |
| Gravity, API | 40.7 | |
| Pour Point, ° C. | −17 | |
| Cloud Point, ° C. | −4 | |
| Viscosity @ 40° C., cSt | 22.86 | |
| Viscosity @ 100° C., cSt | 4.984 | |
| Viscosity Index | 150 | |
| Sim. Dist., ° F., LV % | | |
| ST/5 | 697/732 | |
| 10/30 | 748/798 | |
| 50 | 848 | |
| 70/90 | 900/960 | |
| 95/End Point | 982/1017 | |
| 1000° F.+ | | |
| Yield, weight % | 11.3 | 10.2 |
| Gravity, API | 36.4 | |
| Pour Point, ° C. | −15 | |
| Cloud Point, ° C. | +16 | |
| Viscosity @ 40° C., cSt | 95.30 | |
| Viscosity @ 100° C., cSt | 14.39 | |
| Viscosity Index | 156 | |
| Sim. Dist., ° F., LV % | | |
| ST/5 | 946/972 | |
| 10/30 | 984/1017 | |
| 50 | 1051 | |
| 70/90 | 1088/1152 | |
| 95/End Point | 1179/1257 | |

Although the process for making a pour point depressing lubricant base oil blending component, a pour point depressing lubricant base oil blending component, a method for improving the lubricating properties of a lubricant base oil, and a lubricant base oil blend as described herein have been described in connection with specific embodiments thereof, it will be appreciated by those skilled in the art that additions, deletions, modifications, and substitutions not specifically described may be made without departing from the spirit and scope of the process for making a pour point depressing lubricant base oil blending component, the pour point depressing lubricant base oil blending component, the method for improving the lubricating properties of a lubricant base oil, and the lubricant base oil blend as defined in the appended claims.

That which is claimed is:

1. A process for making a pour point depressing lubricant base oil blending component for blending with a lubricant base oil to produce a lubricant base oil blend, comprising the steps of:
   determining a target pour point of the lubricant base oil blend;
   pyrolyzing a plastics feed comprising polyethylene in a pyrolysis zone at a temperature in the range of about 450° C. to about 700° C. and a residence time in the range of about 3 minutes to about 1 hour to provide a pyrolysis effluent;
   isomerization dewaxing at least a portion of the pyrolysis effluent with an isomerization dewaxing catalyst in a catalytic isomerization dewaxing zone to provide an isomerization dewaxing effluent comprising a pour point depressing lubricant base oil blending component having a pour point higher than the target pour point; and
   recovering the pour point depressing lubricant base oil blending component boiling in the range of about 900° F. to about 1100° F. and having a pour point in the range of about −15° C. to about 0° C., wherein the pour point depressing lubricant base oil blending component is recovered to blend with the lubricant base oil to produce the lubricant base oil blend with the target pour point.

2. The process of claim 1, wherein the pour point depressing lubricant base oil blending component has a kinematic viscosity at 100° C. between about 12 cSt and about 18 cSt.

3. The process of claim 1, wherein the pour point depressing lubricant base oil blending component has a viscosity index between about 130 and about 180.

4. The process of claim 1, wherein the pour point depressing lubricant base oil blending component boils in the range of about 950° F. to about 1100° F.

5. The process of claim 1, wherein at least 20 weight % of the isomerization dewaxing effluent is the pour point depressing lubricant base oil blending component.

6. The process of claim 1, wherein at least 30 weight % of the isomerization dewaxing effluent is the pour point depressing lubricant base oil blending component.

7. The process of claim 1, wherein the isomerization dewaxing catalyst comprises an intermediate pore size molecular sieve.

8. The process of claim 7, wherein the intermediate pore size molecular sieve is selected from the group consisting of ZSM-22, ZSM-23, SSZ-32, ZSM-35, SAPO-11, SM-3, and mixtures thereof.

9. The process of claim 1, wherein the polyethylene is selected from the group consisting of waste polyethylene, virgin polyethylene, and mixtures thereof.

10. The process of claim 1, wherein the polyethylene is selected from the group consisting of high-density polyethylene, low-density polyethylene, and mixtures thereof.

11. The process of claim 1, wherein the plastics feed comprises at least about 95 weight % polyethylene.

12. The process of claim 1, further comprising grinding the plastics feed prior to pyrolyzing the plastics feed in the pyrolysis zone.

13. The process of claim 1, wherein the plastics feed further comprises Fischer-Tropsch derived wax.

14. A method for improving the lubricating properties of the lubricant base oil, the method comprising:
   making a pour point depressing lubricant base oil blending component according to the process of claim 1; and
   blending the lubricant base oil and the pour point depressing lubricant base oil blending component.

15. The method of claim 14, wherein the lubricant base oil is selected from the group consisting of a Group II light neutral lubricant base oil, a Group II medium neutral lubricant base oil, a Group III light neutral lubricant base oil, a Group III medium neutral lubricant base oil, and mixtures thereof.

16. A method for improving the lubricating properties of a lubricant base oil, comprising the steps of:
   determining a target pour point of a lubricant base oil blend, wherein the lubricant base oil blend comprises the lubricant base oil and a pour point depressing lubricant base oil blending component;
   blending with the lubricant base oil a sufficient amount of the pour point depressing lubricant base oil blending component to provide the lubricant base oil blend having the target pour point, wherein the target pour point is a reduced pour point,
   wherein the pour point depressing lubricant base oil blending component is recovered from a plastics feed comprising polyethylene that has been pyrolyzed and catalytically isomerization dewaxed, boils in the range of about 900° F. to about 1100° F., and has a pour point in the range of about −15° C. to about 0° C., and wherein the pour point of the pour point depressing lubricant base oil blending component is higher than the target pour point of the lubricant base oil blend.

17. The method of claim 16, wherein the pour point of the lubricant base oil blend is reduced at least 3° C. below the pour point of the lubricant base oil.

18. The method of claim 16, wherein the pour point of the lubricant base oil blend is reduced at least 6° C. below the pour point of the lubricant base oil.

19. The method of claim 16, wherein the pour point of the lubricant base oil blend is reduced at least 9° C. below the pour point of the lubricant base oil.

20. The method of claim 16, wherein the lubricant base oil is selected from the group consisting of a Group II light neutral lubricant base oil, a Group II medium neutral lubricant base oil, a Group III light neutral lubricant base oil, a Group III medium neutral lubricant base oil, and mixtures thereof.

21. The method of claim 16, wherein the blending with the lubricant base oil the pour point depressing lubricant base oil blending component provides the lubricant base oil blend having an increased viscosity index.

22. The method of claim 16, wherein a viscosity index of the lubricant base oil blend is at least 3 numbers higher than a viscosity index of the lubricant base oil.

23. A method for improving the lubricating properties of a lubricant base oil, comprising the steps of:
   (a) determining a target pour point of a lubricant base oil blend, wherein the lubricant base oil blend comprises the lubricant base oil and a pour point depressing lubricant base oil blending component;
   (b) isomerization dewaxing a pyrolyzed plastics feed by contacting at least a portion of the pyrolyzed plastics feed with an isomerization dewaxing catalyst in a catalytic isomerization dewaxing zone to provide an isomerization dewaxing effluent comprising the pour point depressing lubricant base oil blending component, wherein the pyrolyzed plastics feed originates from a plastics feed comprising polyethylene that has been pyrolyzed, and wherein the pour point depressing lubricant base oil blending component comprises a pour point higher than the target pour point;

(c) recovering the pour point depressing lubricant base oil blending component boiling in the range of about 900° F. to about 1100° F. and having a pour point in the range of about −15° C. to about 0° C.; and (d) blending the pour point depressing lubricant base oil blending component with the lubricant base oil in the proper proportion to produce the lubricant base oil blend having the target pour point, wherein the target pour point is lower than the pour point of the lubricant base oil.

24. The method of claim 23, wherein at least 20 weight % of the isomerization dewaxing effluent is the pour point depressing lubricant base oil blending component.

25. The method of claim 23, wherein at least 30 weight % of the isomerization dewaxing effluent is the pour point depressing lubricant base oil blending component.

26. The method of claim 23, wherein the pour point of the lubricant base oil blend is at least 3° C. below the pour point of the lubricant base oil.

27. The method of claim 23, wherein the pour point of the lubricant base oil blend is at least 6° C. below the pour point of the lubricant base oil.

28. The method of claim 23, wherein the pour point of the lubricant base oil blend is at least 9° C. below the pour point of the lubricant base oil.

29. The method of claim 23, wherein the lubricant base oil is selected from the group consisting of a Group II light neutral lubricant base oil, a Group II medium neutral lubricant base oil, a Group III light neutral lubricant base oil, a Group III medium neutral lubricant base oil, and mixtures thereof.

30. The method of claim 23, wherein the blending step (c) produces a lubricant base oil blend having a higher viscosity index than the lubricant base oil.

31. The method of claim 30, wherein the viscosity index of the lubricant base oil blend is at least 3 numbers higher than a viscosity index of the lubricant base oil.

32. The process of claim 1, further comprising:
conducting the isomerization dewaxing in an isomerization dewaxing zone, wherein the isomerization dewaxing zone is operated at a first severity with a first amount of cracking to provide the pour point depressing lubricant base oil blending component with a pour point higher than the target pour point, and wherein the first severity with the first amount of cracking is less than a second severity with a second amount of cracking to provide a pour point depressing lubricant base oil blending component with a pour point equal to the target pour point.

33. The method of claim 16, wherein the catalytic isomerization dewaxing is conducted in a catalytic isomerization dewaxing zone that is operated at a first severity with a first amount of cracking to provide the pour point depressing lubricant base oil blending component with a pour point higher than the target pour point, and wherein the first severity with the first amount of cracking is less than a second severity with a second amount of cracking to provide a pour point depressing lubricant base oil blending component with a pour point equal to the target pour point.

* * * * *